US010391860B2

(12) United States Patent
Tipton

(10) Patent No.: US 10,391,860 B2
(45) Date of Patent: Aug. 27, 2019

(54) SYSTEMS AND METHODS FOR INSTALLING AND SEALING FUEL PUMP IN FUEL TANK

(71) Applicant: Holley Performance Products, Inc., Bowling Green, KY (US)

(72) Inventor: Larry J. Tipton, Bowling Green, KY (US)

(73) Assignee: Holley Performance Products, Inc., Bowling Green, KY (US)

( * ) Notice: Subject to any disclaimer, the term of this patent is extended or adjusted under 35 U.S.C. 154(b) by 0 days.

(21) Appl. No.: 15/784,671

(22) Filed: Oct. 16, 2017

(65) Prior Publication Data

US 2018/0037106 A1 Feb. 8, 2018

Related U.S. Application Data

(63) Continuation of application No. 14/967,855, filed on Dec. 14, 2015, now Pat. No. 9,796,259.

(51) Int. Cl.
*B60K 15/03* (2006.01)
*F16L 41/14* (2006.01)
(Continued)

(52) U.S. Cl.
CPC ......... *B60K 15/03* (2013.01); *F02M 37/0011* (2013.01); *F02M 37/103* (2013.01);
(Continued)

(58) Field of Classification Search
CPC .......... B60K 15/03; B60K 2015/03467; B60K 2015/03453; F02M 37/106; F02M 37/103; F16L 41/14
See application file for complete search history.

(56) References Cited

U.S. PATENT DOCUMENTS 2,463,701 A * 3/1949 Krueger ................. B65D 41/16
215/321
4,176,633 A 12/1979 McCabe
(Continued)

FOREIGN PATENT DOCUMENTS

| GB | 507914 | 5/2005 |
| GB | 2409239 | 10/2012 |

(Continued)

OTHER PUBLICATIONS

Transmittal Letter of Related Cases.
(Continued)

*Primary Examiner* — Atif H Chaudry
(74) *Attorney, Agent, or Firm* — Middleton Reutlinger

(57) ABSTRACT

Systems and methods for installing and sealing a fuel pump in a fuel tank are disclosed. In one embodiment, a system for installing and sealing a fuel pump in a fuel tank may include (1) a fuel tank with an opening in a surface thereof; and (2) a fuel pump hanger assembly, the fuel pump hanger assembly comprising; (a) a plurality of assembly screws; (b) a plurality of clamping lugs configured to thread onto the plurality of assembly screws and engage an inside surface of the fuel tank; (c) a top plate further comprising; (i) a bearing surface configured to engage an external fuel tank surface; (ii) a plurality of through holes proximate the perimeter of the top plate and perpendicular to the bearing surface; (iii) a plurality of bosses, each of the plurality of bosses adjacent to each through hole, configured to guide and position the each clamping lug; and (d) a gasket positioned between the top plate and the fuel tank.

8 Claims, 5 Drawing Sheets

(51) Int. Cl.
*F02M 37/10* (2006.01)
*F02M 37/00* (2006.01)

(52) U.S. Cl.
CPC .......... *F02M 37/106* (2013.01); *F16L 41/14* (2013.01); *B60K 2015/03243* (2013.01); *B60K 2015/03447* (2013.01); *B60K 2015/03453* (2013.01); *B60K 2015/03467* (2013.01)

(56) References Cited

U.S. PATENT DOCUMENTS

| | | | |
|---|---|---|---|
| 4,193,947 | A | 3/1980 | Ralph |
| 4,225,536 | A | 9/1980 | Dougherty et al. |
| 4,246,875 | A | 1/1981 | Bier et al. |
| 4,246,929 | A | 1/1981 | Wakeman |
| 4,283,353 | A | 8/1981 | Miller |
| 4,465,640 | A | 8/1984 | Dougherty |
| 4,539,960 | A | 9/1985 | Cowles |
| 4,798,190 | A | 1/1989 | Vaznaian et al. |
| 4,798,329 | A | 1/1989 | Mesenich |
| 4,827,888 | A | 5/1989 | Vaznaian et al. |
| 5,009,390 | A | 4/1991 | McAuliffe et al. |
| 5,012,780 | A | 5/1991 | Bugamelli |
| 5,091,858 | A | 2/1992 | Paielli |
| 5,111,793 | A | 5/1992 | Deeds |
| 5,113,831 | A | 5/1992 | Grant |
| 5,123,436 | A | 6/1992 | Koechlein et al. |
| 5,170,764 | A | 12/1992 | Tuckey |
| 5,186,147 | A | 2/1993 | Bellis |
| 5,211,205 | A | 5/1993 | Grant et al. |
| 5,235,948 | A | 8/1993 | Grant et al. |
| 5,261,382 | A | 11/1993 | Nikolai |
| 5,341,785 | A | 8/1994 | Meaney |
| 5,551,404 | A | 9/1996 | Bauerle et al. |
| 5,647,329 | A | 7/1997 | Bucci et al. |
| 5,665,229 | A | 9/1997 | Fitzpatrick et al. |
| 5,716,522 | A | 2/1998 | Chilton et al. |
| 5,807,483 | A | 9/1998 | Cassidy et al. |
| 5,820,754 | A | 10/1998 | Cassidy et al. |
| 5,865,157 | A | 2/1999 | Romanelli et al. |
| 5,876,599 | A | 3/1999 | Sylvester et al. |
| 5,887,569 | A | 3/1999 | Romanelli et al. |
| 5,890,476 | A | 4/1999 | Grant |
| 5,902,480 | A | 5/1999 | Chilton et al. |
| 5,904,130 | A | 5/1999 | Romanelli |
| 6,119,670 | A | 9/2000 | Eitan |
| 6,220,454 | B1 | 4/2001 | Chilton |
| 6,235,073 | B1 | 5/2001 | Bannister et al. |
| 6,378,512 | B1 | 4/2002 | Staggemeier |
| 6,464,870 | B1 | 10/2002 | Castellanos et al. |
| 6,471,072 | B1 | 10/2002 | Rickle et al. |
| 6,520,488 | B1 | 2/2003 | Braswell |
| 6,569,219 | B1 | 5/2003 | Connor et al. |
| 6,613,227 | B2 | 9/2003 | Rickle |
| D486,409 | S | 2/2004 | Grant |
| 6,740,236 | B2 | 5/2004 | Rickle et al. |
| 6,837,228 | B2 | 1/2005 | Grant |
| 6,843,913 | B2 | 1/2005 | Baasch et al. |
| 6,901,888 | B2 | 6/2005 | Baasch et al. |
| 6,913,210 | B2 | 7/2005 | Baasch et al. |
| 6,997,401 | B2 | 2/2006 | Uhde et al. |
| 7,066,155 | B2 | 6/2006 | Grant |
| 7,070,641 | B1 | 7/2006 | Gunderson et al. |
| 7,156,625 | B2 | 1/2007 | Grant |
| 7,168,690 | B2 | 1/2007 | Grant |
| 7,207,786 | B2 | 4/2007 | Grant |
| D543,555 | S | 5/2007 | Braswell et al. |
| 7,217,361 | B2 | 5/2007 | Connor et al. |
| D543,999 | S | 6/2007 | Braswell et al. |
| 7,247,183 | B2 | 7/2007 | Connor et al. |
| 7,255,331 | B2 | 8/2007 | Grant |
| D555,668 | S | 11/2007 | Benoit |
| 7,300,025 | B2 * | 11/2007 | Korcz .................. H02G 3/123 220/3.9 |
| 7,343,896 | B2 | 3/2008 | Grant |
| D578,550 | S | 10/2008 | Benoit |
| 7,634,983 | B2 | 12/2009 | Grant |
| 7,806,096 | B2 | 10/2010 | Grant |
| 7,927,400 | B2 | 4/2011 | Graber et al. |
| 7,976,712 | B2 | 7/2011 | Rocheux et al. |
| D645,055 | S | 9/2011 | Benoit |
| D645,057 | S | 9/2011 | Benoit |
| D645,058 | S | 9/2011 | Benoit |
| D648,746 | S | 11/2011 | Tipton et al. |
| D649,979 | S | 12/2011 | Gieske et al. |
| 8,080,086 | B2 | 12/2011 | Graber et al. |
| D653,263 | S | 1/2012 | Gieske et al. |
| D659,164 | S | 5/2012 | Tomlinson et al. |
| 8,372,278 | B1 | 2/2013 | Nguyen et al. |
| D677,755 | S | 3/2013 | Tipton et al. |
| D680,134 | S | 4/2013 | Fordyce et al. |
| 8,490,682 | B2 | 7/2013 | Graber et al. |
| 8,524,091 | B2 | 9/2013 | Rocheux et al. |
| D696,300 | S | 12/2013 | Arotzarena et al. |
| 8,715,497 | B2 | 5/2014 | Schnipke et al. |
| 8,728,308 | B2 | 5/2014 | Schnipke et al. |
| 8,763,175 | B2 * | 7/2014 | Li ........................ E03C 1/0402 137/359 |
| D721,389 | S | 1/2015 | Gieske et al. |
| D724,179 | S | 3/2015 | Keenan et al. |
| 9,212,642 | B2 | 12/2015 | Petersen |
| 9,441,571 | B2 | 9/2016 | Petersen |
| 9,555,353 | B2 | 1/2017 | Graber et al. |
| 9,796,259 | B2 | 10/2017 | Tipton |
| 2002/0033168 | A1 * | 3/2002 | Noda ................... F02M 37/103 123/509 |
| 2003/0057146 | A1 | 3/2003 | Rickle et al. |
| 2003/0057149 | A1 | 3/2003 | Iwamoto |
| 2003/0062428 | A1 | 4/2003 | Baasch et al. |
| 2003/0132156 | A1 | 7/2003 | Rickle |
| 2004/0025832 | A1 | 2/2004 | Baasch et al. |
| 2004/0084032 | A1 | 5/2004 | Baasch et al. |
| 2004/0094488 | A1 | 5/2004 | Grant |
| 2004/0139950 | A1 | 7/2004 | Flynn et al. |
| 2004/0146413 | A1 | 7/2004 | Grant |
| 2004/0251194 | A1 | 12/2004 | Brzozowski et al. |
| 2005/0006300 | A1 | 1/2005 | Sato et al. |
| 2005/0023210 | A1 | 2/2005 | Connor et al. |
| 2005/0084391 | A1 | 4/2005 | Grant |
| 2005/0284451 | A1 | 12/2005 | Uhde et al. |
| 2006/0064956 | A1 | 3/2006 | Connor et al. |
| 2006/0065248 | A1 * | 3/2006 | Leymarie ........... F02M 25/0854 123/509 |
| 2008/0308068 | A1 | 12/2008 | Grant |
| 2009/0084736 | A1 | 4/2009 | Rocheux et al. |
| 2009/0120858 | A1 | 5/2009 | Kojima et al. |
| 2009/0249951 | A1 | 10/2009 | Graber et al. |
| 2010/0181238 | A1 | 7/2010 | Henry |
| 2010/0294464 | A1 | 11/2010 | Graber et al. |
| 2011/0155658 | A1 | 6/2011 | Graber et al. |
| 2011/0233123 | A1 | 9/2011 | Rocheux et al. |
| 2012/0175297 | A1 | 7/2012 | Schnipke et al. |
| 2012/0183459 | A1 | 7/2012 | Rocheux |
| 2012/0224933 | A1 * | 9/2012 | Anderson ................. F16L 5/06 411/313 |
| 2012/0248021 | A1 | 10/2012 | Schnipke et al. |
| 2012/0248024 | A1 | 10/2012 | Wells et al. |
| 2012/0294731 | A1 | 11/2012 | Weckerly et al. |
| 2012/0294732 | A1 | 11/2012 | Weckerly et al. |
| 2013/0298868 | A1 | 11/2013 | Wittkopf et al. |
| 2013/0298871 | A1 | 11/2013 | Bennett et al. |
| 2014/0127066 | A1 | 5/2014 | Weckerly et al. |
| 2014/0144914 | A1 | 5/2014 | Yager et al. |
| 2014/0158091 | A1 | 6/2014 | Petersen |
| 2014/0202951 | A1 | 7/2014 | Graber et al. |
| 2014/0238510 | A1 | 8/2014 | Henry et al. |
| 2015/0108256 | A1 | 4/2015 | Flynn et al. |
| 2015/0114347 | A1 | 4/2015 | Hudnall et al. |
| 2016/0025050 | A1 | 1/2016 | Salsbury |
| 2016/0129782 | A1 | 5/2016 | Tipton et al. |
| 2016/0201581 | A1 | 7/2016 | Wittkopf et al. |
| 2016/0339363 | A1 | 11/2016 | Yost et al. |

(56) References Cited

U.S. PATENT DOCUMENTS

2017/0173500 A1    5/2017  Salsburey et al.
2017/0166045 A1    6/2017  Tipton

FOREIGN PATENT DOCUMENTS

| JP | 2012036792 | 2/2012 |
|---|---|---|
| WO | 03027476 | 8/2003 |
| WO | 2004042221 | 9/2004 |
| WO | 2015108657 | 7/2015 |
| WO | 2016073978 | 5/2016 |
| WO | 2017106331 | 6/2017 |

OTHER PUBLICATIONS

US Patent and Trademark Office International Search Report and Written Opinion for PCT/US2016/066638 dated Jan. 31, 2017.
National Stage Entry into Australia on Jun. 6, 2018, Application No. 2016370576 entitled "Systems and Methods for Installing and Sealing Fuel Pump in Fuel Tank".
National Stage Entry into China on Jun. 14, 2018, Application No. 201680073592.7 entitled "Systems and Methods for Installing and Sealing Fuel Pump in Fuel Tank".

\* cited by examiner

SYSTEMS AND METHODS FOR INSTALLING AND SEALING FUEL PUMP IN FUEL TANK

CLAIM TO PRIORITY

This Continuation Patent Application claims priority to and benefit of, under 35 U.S.C. § 120, U.S. patent application Ser. No. 14/967,855, filed Dec. 14, 2015 and titled, "Systems and Methods for Installing and Sealing Fuel Pump in Fuel Tank", all of which is incorporated by reference herein.

BACKGROUND OF THE INVENTION

1. Field of the Invention

The present invention generally relates to systems and methods for installing and sealing in-tank fuel pumps.

2. Description of the Related Art

There is often demand for non-Original Equipment Manufacturer ("OEM") fuel pumps when fuel supply requirements change, or if a non-OEM pump is technically superior to an OEM pump. In-tank fuel pumps are often preferred over external pumps due to, for example, noise, vibration, and harshness ("NVH") improvements, increased pump cooling, improved system packaging, and mitigation of possible damage from external sources. One common problem with the use of a non-OEM fuel pump, however, is adaptation to an existing fuel tank.

SUMMARY OF THE INVENTION

Systems and methods for installing and sealing a fuel pump in a fuel tank are disclosed. In one embodiment, a system for installing and sealing a fuel pump in a fuel tank may include a fuel tank with an opening, and a fuel pump hanger assembly. The fuel pump hanger assembly may comprise a plurality of assembly screws; a plurality of clamping lugs configured to thread onto the plurality of assembly screws and engage an inside surface of the fuel tank; a top plate that may comprise a bearing surface configured to engage an external fuel tank surface, a plurality of through holes proximate the perimeter of the top plate and perpendicular to the bearing surface, and a plurality of bosses, each of the plurality of bosses adjacent to each through hole, configured to guide and position the each clamping lug. A gasket may be positioned between the top plate and the fuel tank.

In one embodiment, the system may further include a split clamping ring positioned between the plurality of clamping lugs and an internal fuel tank surface.

In one embodiment, a method for installing and sealing a fuel pump in a fuel tank may include (1) cutting an opening in a top surface of a fuel tank; (2) inserting at portion of a fuel pump hanger assembly into the opening; and (3) securing a plurality of assembly screws in the top of the fuel pump hanger assembly to cause a plurality of clamping lugs to engage and tighten against an internal fuel tank surface.

In one embodiment, the method may further include inserting a split clamping ring into the opening and adhering the split clamping ring to the interior tank surface around the hole.

In one embodiment, a method for uninstalling a fuel pump sealed in a fuel tank may include (a) loosening a plurality of assembly screws in a top plate of a fuel pump hanger assembly until a plurality of assembly lugs unclamp from an inside surface of a fuel pump and rotate against a plurality of internal stops in the top plate; and (2) removing the fuel pump hanger assembly from the fuel tank.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
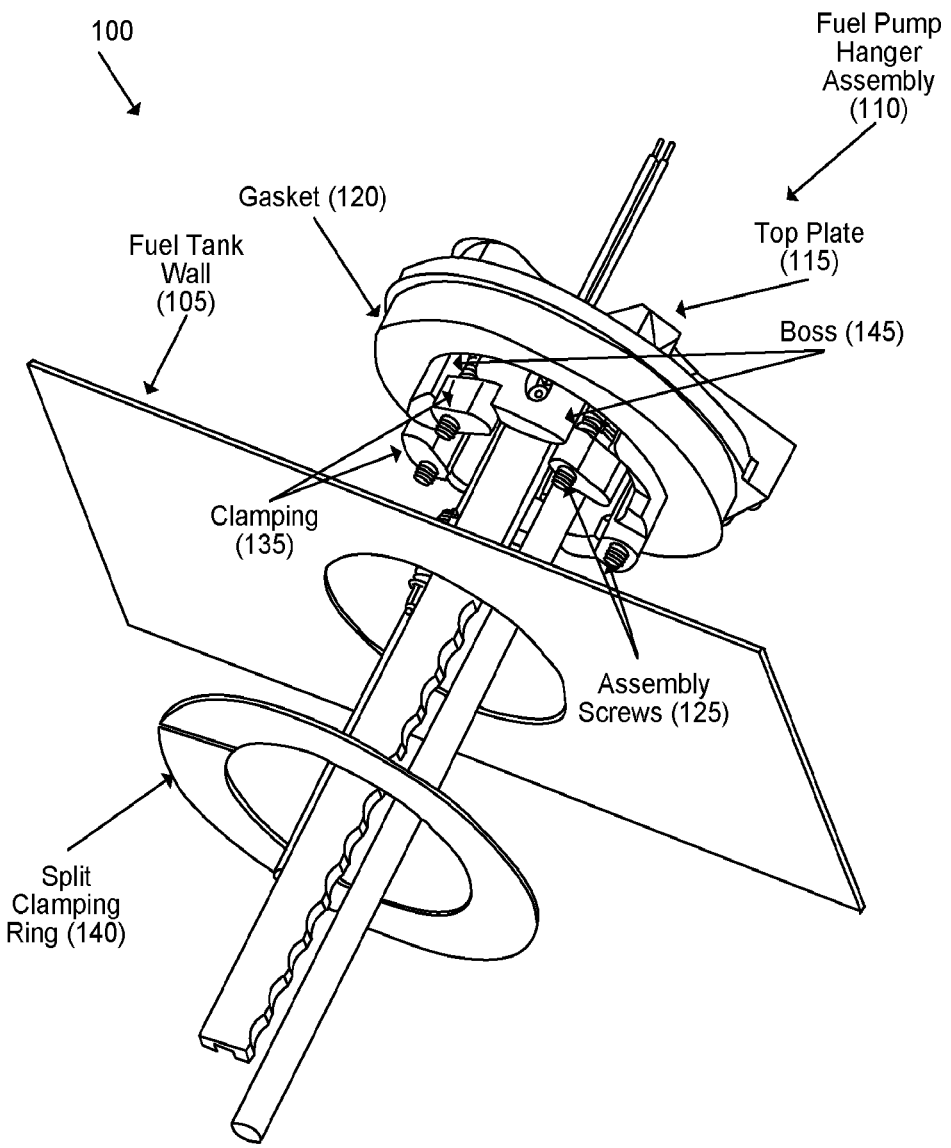
FIG. 1a depicts a system for installing and sealing a fuel pump in a fuel tank in one state of installation, according to one embodiment.
Figure 1B:
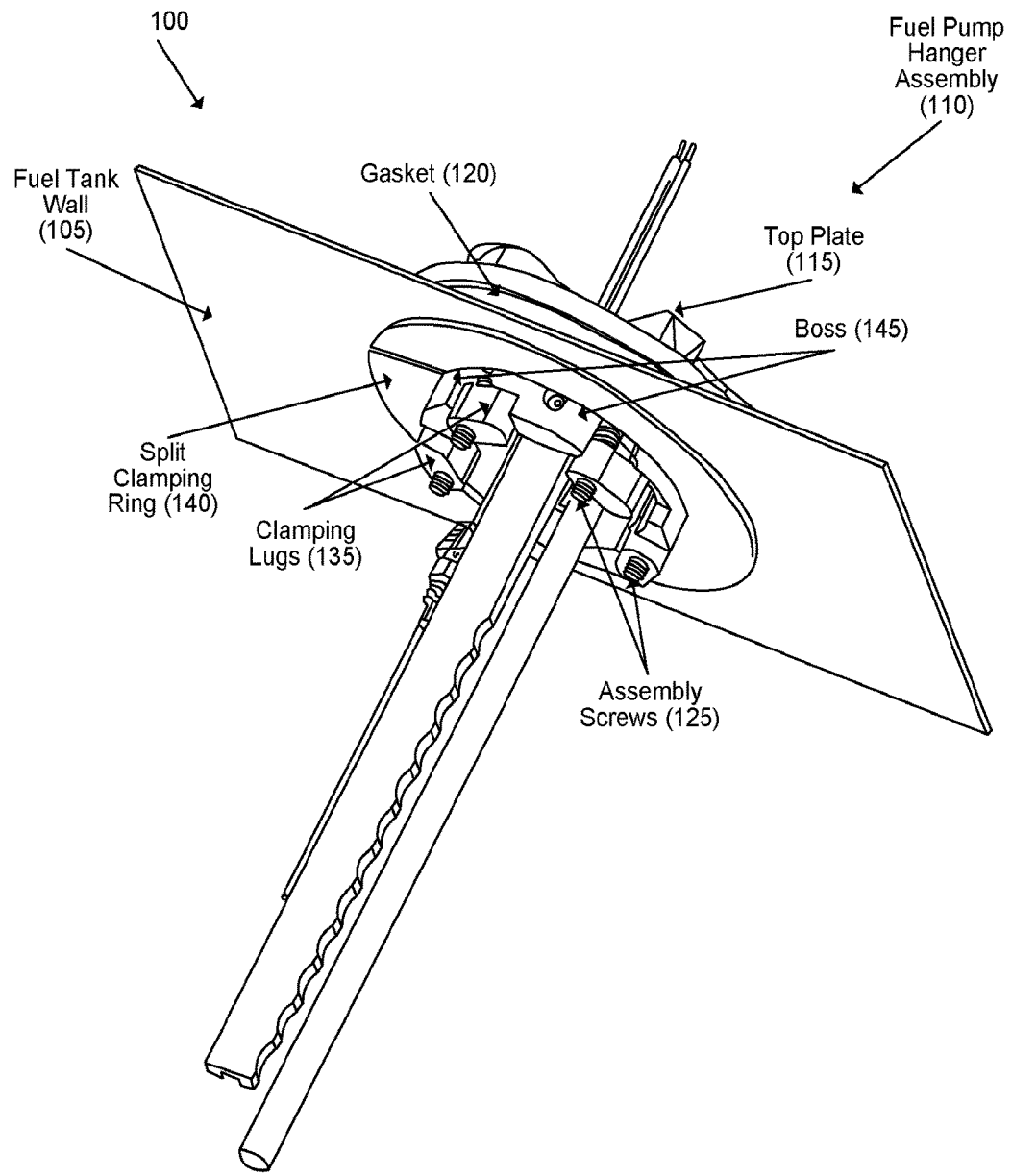
FIG. 1b depicts a system for installing and sealing a fuel pump in a fuel tank in a different state of installation, according to one embodiment.
Figure 1C:
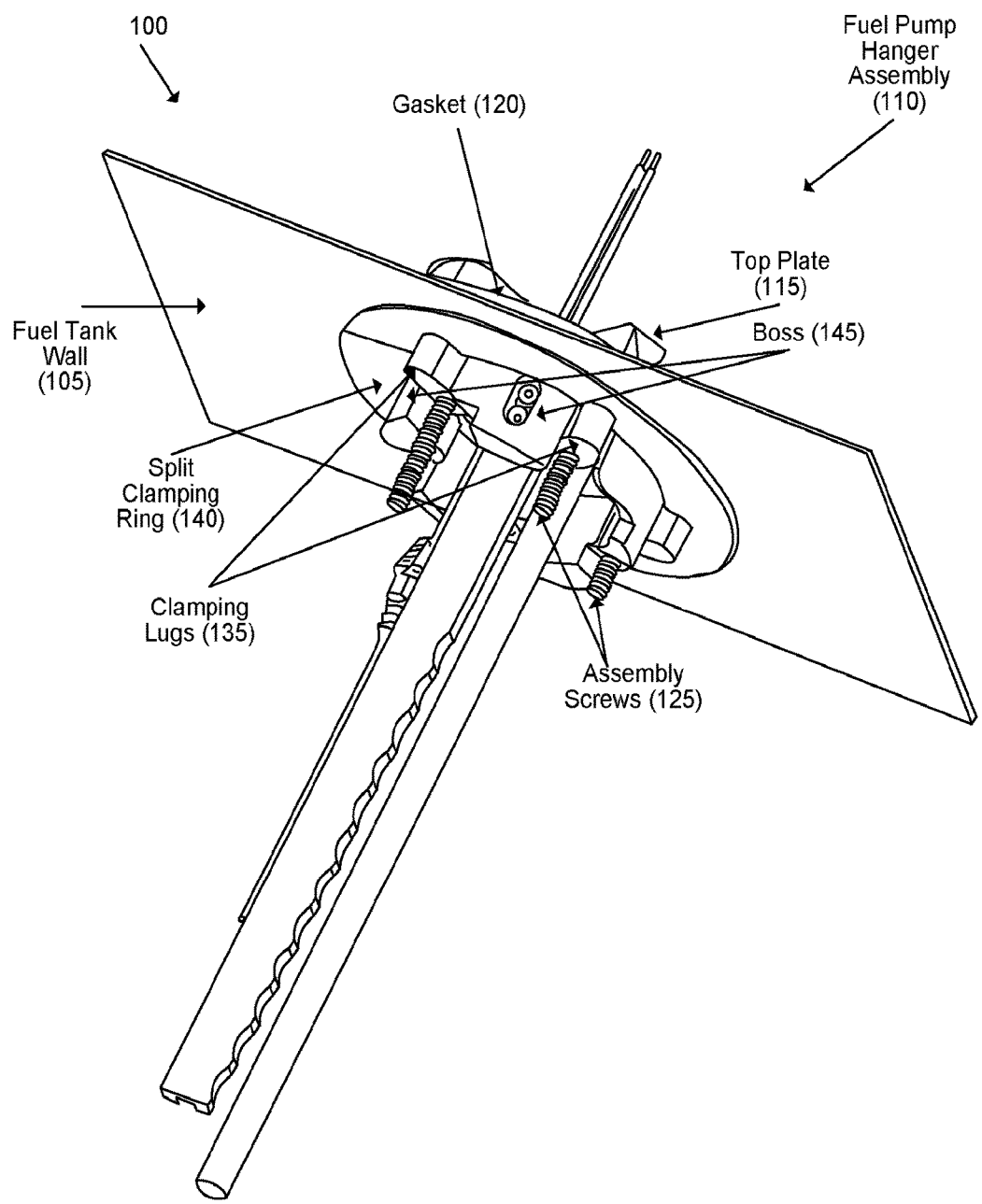
FIG. 1c depicts a system for installing and sealing a fuel pump in a fuel tank in a third state of installation, according to one embodiment.
Figure 2:
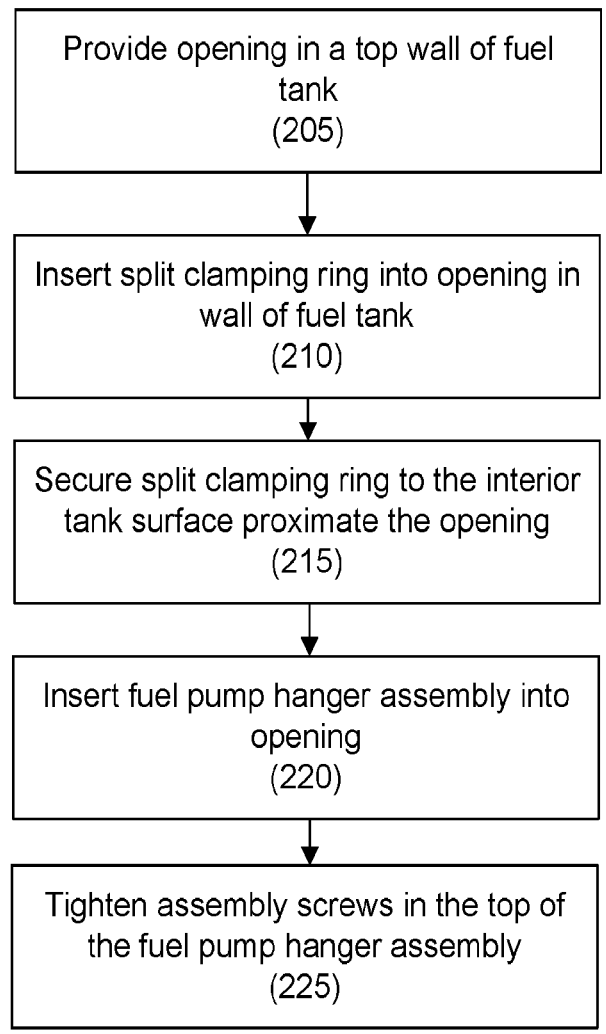
FIG. 2 depicts a method for installing and sealing an internal fuel pump in a fuel tank.
Figure 3:
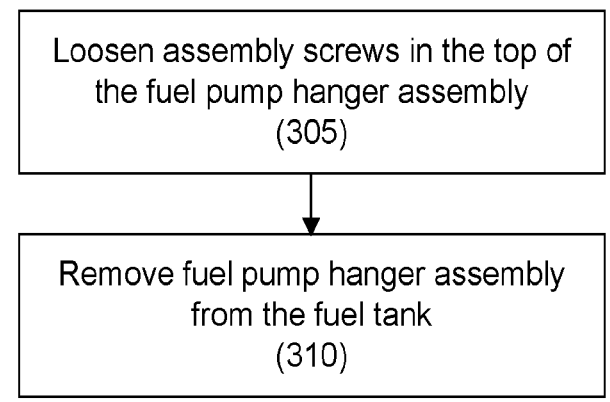
FIG. 3 depicts a method for uninstalling internal fuel pump sealed in a fuel tank.

Several embodiments of the present invention and their advantages may be understood by referring to FIGS. 1-3.

Referring to FIGS. 1a-c, a fuel pump system for a fuel tank is disclosed. System 100 may include fuel tank wall 105 and fuel pump hanger assembly 110. Fuel pump hanger assembly 110 may include top plate 115 that may provide a bearing surface between fuel pump hanger assembly 110 and fuel tank 105. Fuel pump hanger assembly 110 may also include gasket 120 that may be positioned between the fuel tank wall 105 and the top plate 115. In one embodiment, gasket 120 may be made of be foam or any other suitable compressible material. System 100 may also include a plurality of assembly screws 125 that may extend through top plate 115 and through fuel tank wall 105.

In one embodiment, each assembly screw 125 may use a sealing washer 130 (not shown). Sealing washers 130 may be made of aluminum or any suitable material, and may include insert molded rubber. Fuel pump hanger assembly 110 may also include a plurality of clamping lugs 135. The threaded portion of each assembly screw 125 may be coated with a prevailing torque material to secure and may engage with each clamping lug 135. Clamping lug 135 may be made of metal, plastic, or any other suitable material. Clamping lugs 135 may secure top plate 115 to fuel tank wall 105.

In one embodiment, fuel pump hanger assembly 110 may also include split clamping ring 140. Split clamping ring 140 may be positioned between fuel tank wall 105 and the plurality of clamping lugs 135.

In one embodiment, top plate 115 may include a plurality of bosses 145. Each boss 145 may be configured to limit rotation of a proximate assembly lug 135 and guide the assembly lug 135 into a specific orientation relative to top plate 115.

Referring to FIG. 2, a method for installing a universal fuel pump into a fuel tank is described.

In step 205, an opening in the fuel tank may be provided. In one embodiment, the opening may be in a top wall of the fuel tank. Other locations for the opening may be used as necessary and/or desired. The fuel tank may be a fuel tank intended for use with any vehicle. The fuel tank may be metal or plastic. The opening may be cut through a flat portion of the fuel tank surface, or it may be cut through a corrugated portion of the tank surface. The opening may be any size necessary to fit the intended fuel pump. In one embodiment, the opening may be 3.25" in diameter.

In step 210, a split clamping ring for plastic tanks may be inserted into the opening. In one embodiment, the split clamping ring may be larger than the opening, and may be flexible to allow insertion into the opening. Flexing the split clamping ring may allow a user to spiral or screw the split clamping ring into the fuel tank interior through the opening.

In step 215, the split clamping ring may be secured to the interior tank surface proximate the opening. In one embodiment, the split clamping ring may have one surface with, for example, a pressure sensitive adhesive. The pressure sensitive adhesive may be covered with a paper backing that may be removed to reveal the adhesive surface.

In step 220, the fuel pump hanger system may be inserted into the opening.

In step 225, the assembly screws in the top plate of the fuel pump hanger system may be tightened by, for example, rotating the screws. In one embodiment, the screws may be tightened to a specified torque; in another embodiment, the screws may be tightened to a specified gasket compression.

Referring to FIG. 3, a method for removing a fuel pump from a fuel tank is described.

In step 305, a user may loosen the assembly screws in the top plate of the fuel pump hanger assembly. The assembly screws may be unscrewed until the clamping load is removed and the assembly lugs rotate to their uninstalled position against the internal stops of the top plate.

In step 310, a user may remove the fuel pump assembly from the fuel tank.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for installing and sealing a fuel pump in a fuel tank, comprising:
   providing an opening in a fuel tank;
   securing a split clamping ring, of a fuel pump hanger assembly, adjacent to the opening on the inner surface of the fuel tank;
   positioning a plurality of clamping lugs of the fuel pump hanger assembly through the opening and through the split clamping ring;
   inserting a fuel pump hanger assembly into the opening;
   securing a plurality of assembly screws in the top of the fuel pump hanger assembly; and
   moving said clamping lugs from a generally circumferentially aligned first elevation adjacent to a lower surface of one of a plurality of bosses to a second elevation, non-circumferentially aligned position, and causing the plurality of clamping lugs to move to a position at least partially radially outward of the opening, and to engage an adjacent one of said plurality of bosses and tighten against the split clamping ring.

2. The method of claim 1, further comprising guiding the clamping lugs through the opening with the plurality of bosses.

3. The method of claim 1, further comprising rotating the plurality of assembly screws to move said clamping lugs.

4. The method of claim 3, further comprising moving said plurality of clamping lugs vertically with said rotation of the plurality of assembly screws.

5. The method of claim 1, further comprising:
   inserting a split clamping ring into the opening; and
   adhering the split clamping ring to the interior tank surface proximate the opening.

6. The method of claim 1, wherein the opening in a top surface of a fuel tank is through a corrugated portion of the top surface.

7. A method for uninstalling a fuel pump sealed in a fuel tank, comprising:
   loosening a plurality of assembly screws in a top plate of a fuel pump hanger assembly;
   unclamping a plurality of assembly lugs from a split clamping ring on an inside surface of a fuel tank;
   rotating the plurality of assembly lugs from against the split clamping ring toward a generally circumferentially aligned position radially inward of an opening in said split clamping ring against a plurality of internal stops in the top plate to allow passage of the lugs through an opening in the fuel tank, and changing the position of the plurality of assembly lugs away from said split clamping ring and into the fuel tank; and
   removing the fuel pump hanger assembly from the fuel tank.

8. A method of installing a fuel pump in a fuel tank, comprising the steps of:
   providing a fuel tank with an opening;
   applying a split clamping ring adjacent to the opening on an interior surface of the fuel tank;
   providing a fuel pump hanger assembly with a gasket to engage an outer surface of the fuel tank having said opening;
   providing a top wall of said fuel pump hanger assembly with a plurality of assembly screws extending through the top wall;
   positioning a plurality of assembly lugs on a lower side of the top wall through the opening;
   rotating said plurality of assembly screws;
   moving each of said plurality of assembly lugs from a generally circumferentially aligned radially inward of said opening, first elevation adjacent to a lower surface of one of a plurality of bosses to a second elevation, non-circumferentially aligned position radially outward of said opening, causing the plurality of clamping lugs to engage an adjacent one of said plurality of bosses and tighten against the split clamping ring;
   engaging said split clamping ring with said plurality of assembly lugs to lock said fuel pump hanger assembly in position.

\* \* \* \* \*